US010401869B2

(12) United States Patent
Yi et al.

(10) Patent No.: US 10,401,869 B2
(45) Date of Patent: Sep. 3, 2019

(54) AUTONOMOUS DRIVING SYSTEM AND AUTONOMOUS DRIVING METHOD

(71) Applicants: HYUNDAI MOTOR COMPANY, Seoul (KR); KIA MOTORS CORPORATION, Seoul (KR)

(72) Inventors: Kichang Yi, Suwon-si (KR); Hui Sung Lee, Gunpo-si (KR); Hyoung Shin, Yongin-si (KR); Youngwook Song, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 204 days.

(21) Appl. No.: 15/619,977

(22) Filed: Jun. 12, 2017

(65) Prior Publication Data

US 2018/0196444 A1 Jul. 12, 2018

(30) Foreign Application Priority Data

Jan. 6, 2017 (KR) .................. 10-2017-0002282

(51) Int. Cl.
*G05D 1/02* (2006.01)
*B62D 15/02* (2006.01)
(Continued)

(52) U.S. Cl.
CPC ........... *G05D 1/0276* (2013.01); *B60W 30/00* (2013.01); *B62D 15/021* (2013.01);
(Continued)

(58) Field of Classification Search
CPC .. G05D 1/0276; G05D 1/0223; B62D 15/025; B62D 15/021; G08G 1/096783;
(Continued)

(56) References Cited

U.S. PATENT DOCUMENTS 8,989,053 B1 * 3/2015 Skaaksrud ............ H04W 12/06
370/255
9,913,240 B2 * 3/2018 Skaaksrud ............ H04W 12/06
(Continued)

FOREIGN PATENT DOCUMENTS

KR 10-2016-0037544 A 4/2016
KR 10-2016-0057759 A 5/2016

*Primary Examiner* — Frederick M Brushaber
(74) *Attorney, Agent, or Firm* — Brinks Gilson & Lione (57) ABSTRACT

An autonomous driving system having an autonomous driving assistance apparatus includes: a gateway unit wirelessly communicating with a router among a plurality of routers installed in an autonomous driving road; a signal processing unit providing identification information of a vehicle at the time of setting a wireless communication link with each router and providing driving path information of the vehicle to the router every set cycle; a path tracking unit determining a speed, a progress direction, and a steering angle of the vehicle included in the driving path information so as to drive the vehicle based on driving path information; a speed control unit controlling a speed of the vehicle based on the speed determined by the path tracking unit; and a steering angle control unit controlling a steering angle of the vehicle based on the progress direction and steering angle determined by the path tracking unit.

14 Claims, 5 Drawing Sheets

(51) Int. Cl.
*G08G 1/0967* (2006.01)
*B60W 30/00* (2006.01)
*H04W 64/00* (2009.01)
*H04L 29/08* (2006.01)
*G08G 1/01* (2006.01)

(52) U.S. Cl.
CPC ......... *B62D 15/025* (2013.01); *G05D 1/0223* (2013.01); *G08G 1/0116* (2013.01); *G08G 1/09675* (2013.01); *G08G 1/096725* (2013.01); *G08G 1/096741* (2013.01); *G08G 1/096783* (2013.01); *H04L 67/12* (2013.01); *H04W 64/006* (2013.01)

(58) Field of Classification Search
CPC ....... G08G 1/096725; G08G 1/096741; G08G 1/09675; G08G 1/0116; H04W 64/006; B60W 30/00; H04L 67/12
See application file for complete search history.

(56) References Cited

U.S. PATENT DOCUMENTS

| | | | |
|---|---|---|---|
| 9,949,228 B2* | 4/2018 | Skaaksrud | H04W 12/06 |
| 2007/0005609 A1* | 1/2007 | Breed | B60N 2/2863 |
| 2015/0153175 A1* | 6/2015 | Skaaksrud | H04W 12/06 701/23 |
| 2015/0154557 A1* | 6/2015 | Skaaksrud | H04W 12/06 705/337 |
| 2016/0189542 A1* | 6/2016 | Myer | G08G 1/096783 340/905 |
| 2016/0320773 A1* | 11/2016 | Skaaksrud | H04W 12/06 |
| 2017/0060129 A1* | 3/2017 | Ross | B60W 50/029 |
| 2018/0017970 A1* | 1/2018 | Kim | G05D 1/0011 |
| 2018/0050664 A1* | 2/2018 | Tarte | B60R 25/31 |
| 2018/0292222 A1* | 10/2018 | Lin | G01C 21/3446 |

* cited by examiner

AUTONOMOUS DRIVING SYSTEM AND AUTONOMOUS DRIVING METHOD

CROSS-REFERENCE TO RELATED APPLICATION

This application claims priority to and the benefit of Korean Patent Application No. 10-2017-0002282, filed Jan. 6, 2017, the entire contents of which are incorporated herein by reference.

FIELD

The present disclosure relates to an autonomous driving system including an autonomous driving assistance apparatus mounted on a vehicle.

BACKGROUND

The statements in this section merely provide background information related to the present disclosure and may not constitute prior art.

With the progress of a vehicle technology, an autonomous driving age in which a vehicle is driven on a road by determination thereof has been entered. An autonomous driving vehicle is mounted with an autonomous driving system for autonomous driving and performs the autonomous driving based on the autonomous driving system.

However, the autonomous driving which heavily relies on current general roads is significantly difficult because numerous variables exist on the road. In addition, the autonomous driving system needs to be mounted on each vehicle in order to autonomously drive and there is a significant burden in cost, and as a result, it is inefficient to mount the autonomous driving system.

The above information disclosed in this Background section is only for enhancement of understanding of the background of the present disclosure and therefore it may contain information that does not form the prior art that is already known to a person of ordinary skill in the art.

SUMMARY

The present disclosure provides an autonomous driving system designed to be installed on a road, by which the corresponding road becomes an autonomous driving road and enables an autonomous driving vehicle and also a general vehicle to be autonomously driven on the autonomous driving road.

The present disclosure also provides an autonomous driving system which enables the autonomous driving system to be implemented without a central server.

The exemplary forms of the present disclosure may be used for achieving other objects which are not mentioned in detail in addition to the objects.

An exemplary form of the present disclosure provides an autonomous driving system including an autonomous driving assistance apparatus. The autonomous driving system includes: a gateway unit configured to perform wireless communication with a router within a communication range among a plurality of routers installed in an autonomous driving road; a signal processing unit configured to provide identification information of a vehicle at the time of setting a wireless communication link with each router and provide driving path information of the vehicle to the router every set cycle; a path tracking unit configured to determine a speed, a progress direction, and a steering angle of the vehicle included in the driving path information so that the vehicle is driven based on the driving path information received from the router; a speed control unit configured to control a speed of the vehicle based on the speed information determined by the path tracking unit; and a steering angle control unit configured to control a steering angle of the vehicle based on the progress direction and steering angle determined by the path tracking unit.

The signal processing unit may provide specification information of the vehicle to an entrance router when receiving a request for the specification information of the vehicle from the entrance router installed on an access road of an autonomous driving road, and the gateway unit may receive the driving path information from the entrance router when the specification information of the vehicle satisfies a set specification and receive a driving prevention announcement in the autonomous driving road from the entrance router when the specification information does not satisfy the set specification.

The signal processing unit may announce the progress direction at a road branch point or an outgoing intention to an outgoing point to a router which is under communication at present when a distance between a current location and the road branch point or the outgoing point is within a predetermined distance in the case where a front road is the road branch point such as an intersection, or the like or the outgoing point of the autonomous driving road exists and the vehicle turns at the road branch point or goes out to the outgoing point.

The gateway unit may receive the driving path information received from each router of the plurality of routers and the driving path information may be driving path information for driving the vehicle in a set section.

The set section may be a maximum distance section where one router of the plurality of routers is configured to perform the wireless communication with the vehicle based on the autonomous driving road.

The gateway unit may receive the driving path information which needs to be provided by an abnormal router from a pre-router of the abnormal router, and the driving path information is provided when the abnormal router exists.

When information of abnormality of other vehicle or an abnormality of at least one router of the plurality of routers is received, the signal processing unit may provide the received information to a control center.

The autonomous driving system may further include: an entrance router installed in each access road of the autonomous driving road; an outgoing router installed in each outgoing road of the autonomous driving road; and a plurality of routers installed on a road between each entrance router and each outgoing router, wherein each entrance router, each outgoing router, and each of the plurality of routers have unique identification information, and is configured to perform the wireless communication with the vehicle within the communication range, and provide the driving path information for the set section to the vehicle to allow the vehicle to be driven to a set movement path within the set section based on the driving path information.

Each entrance router, each outgoing router, and each of the plurality of routers may perform the wireless communication with a neighboring router to determine whether the neighboring router is malfunctioning.

Each entrance router, each outgoing router, and the router positioned in a curve section among the plurality of routers may determine a vehicle kinetic modeling coefficient corresponding to a vehicle type and perform vehicle kinetic interpretation based on the determined vehicle kinetic modeling coefficient to determine the driving path information and provide the determined driving path information to the vehicle.

Each entrance router, each outgoing router, and each of the plurality of routers may compare the vehicle speed and steering angle received from the vehicle with the vehicle speed and steering angle included in the driving path information provided to a corresponding vehicle to determine whether the corresponding vehicle is abnormal.

A current router and routers positioned after the current router are configured to provide the driving path information corresponding to a direction turn and an outgoing to the autonomous driving assistance apparatus through the wireless communication among neighboring routers based on the progress direction of the vehicle to allow a corresponding vehicle to change a direction to a target direction or induce the corresponding vehicle to a corresponding outgoing point at the road branch point, and the autonomous driving assistance apparatus configured to provide the outgoing intention in the progress direction or to the outgoing point at the road branch point.

In the exemplary forms of the present disclosure, an autonomous driving vehicle and also a general vehicle are enabled to be autonomously driven with low cost. Further, reliable autonomous driving is enabled through vehicle kinetic interpretation suitable for a characteristic for each vehicle type of the general vehicle.

In addition, the present disclosure provides the autonomous driving system which may be enabled without using a central server and thus innovatively reduce system construction cost.

Moreover, the autonomous driving system can be used as a traffic accident preventing system on the general road as well as an autonomous driving road.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure. In the drawings, parts not associated with description are omitted for clearly describing the exemplary form of the present disclosure. Further, detailed description of known art which is widely known will be omitted.

Throughout the specification, unless explicitly described to the contrary, the word "comprise" and variations such as "comprises" or "comprising", will be understood to imply the inclusion of stated elements but not the exclusion of any other elements. In addition, terms including "unit", "module", and the like disclosed in the specification mean a unit that processes at least one function or operation and this may be implemented by hardware or software or a combination of hardware and software.

Hereinafter, an autonomous driving system in an exemplary form of the present disclosure will be described with reference to the accompanying drawings.

Figure 1:
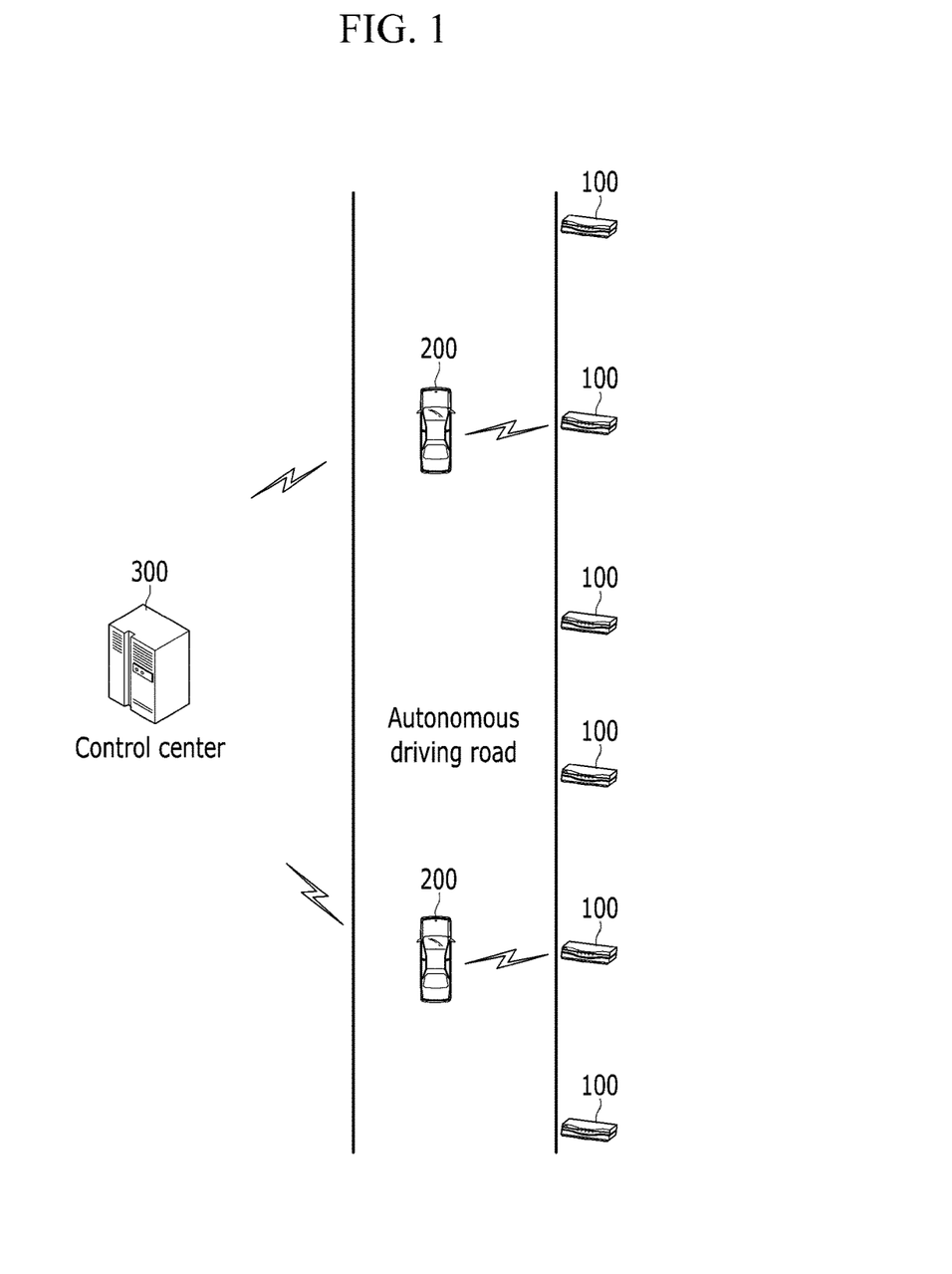
FIG. 1 is a configuration diagram of an autonomous driving system.

FIG. 1 is a configuration diagram of an autonomous driving system in an exemplary form of the present disclosure. Referring to FIG. 1, the autonomous driving system includes a plurality of routers 100 installed on a road and an autonomous driving assistance apparatus 200 mounted on a vehicle.

Each of the plurality of routers 100 has unique identification information (identification code), and is installed at the edge of the road or on a sidewalk or the road such that a general road in which the routers 100 are installed becomes an autonomous driving road. In one form, the respective routers 100 may be installed at a predetermined interval while communication ranges overlap with each other, but the routers 100 may be installed in a straight-line section so that the communication ranges do not overlap with each other or to have a larger interval than a curve section.

Each router 100 performs wireless communication (e.g., short-range wireless communication, RF wireless communication, Bluetooth communication, and the like) with a vehicle positioned within the communication range and provides information (hereinafter, referrer to as "driving path information") on a driving path of a setting section to the vehicle through the wireless communication. The driving path information includes information on a progress direction, a progress speed (vehicle speed), a steering angle, and the like of the vehicle. The setting section as an autonomous driving section of which one router takes charge is, for example, a maximum distance section in which one router may perform the wireless communication with the vehicle based on the road. However, when the setting section is the straight-line section, the setting section may be longer than the maximum distance section in which one router may perform the wireless communication with the vehicle.

In addition, each router 100 performs the wireless communication with the vehicle positioned in a setting range (that is, the setting section) to receive speed and steering information of the vehicle from the vehicle. Each router 100 determines whether the vehicle is abnormal through the speed and steering information of the vehicle, which is received from the vehicle. For example, the router 100 determines that the vehicle is abnormal when the vehicle is in a stop state through the speed of the vehicle and determines that the vehicle is abnormal when the speed of the vehicle and the speed of the driving path information provided by the steering information are different from each other or the driving paths are different from each other.

Each router 100 performs the wireless communication even with two neighboring routers (an entry or outgoing point, that is, one router in the case of a router positioned at an end point), determines whether the neighboring router is abnormal through the wireless communication, and provides the speed and steering information of the vehicle received from the vehicle to the neighboring router. Hereinafter, a router positioned at a front of the router based on the vehicle progress direction between the neighboring routers is referred to as a pre-router and a router positioned at a rear of the router is referred to as a post router.

In addition, each router 100 provides the driving path information which the abnormal router will provide to the vehicle instead of the abnormal router when the neighboring router is abnormal. For example, each router may provide the driving path information instead of the post router when the post router is abnormal based on the progress direction of the vehicle.

Meanwhile, a general vehicle which may be driven in the autonomous driving road needs to include a cruise control apparatus, a motor driven power steering (MDPS), and an autonomous emergency brake (AEB) system as a required specification and a general vehicle which does not have the required specification may not be autonomously driven, and as a result, the general vehicle should not enter the autonomous driving road. Therefore, the router (hereinafter, referred to as an entry router) 100 installed on an access road (entrance) of the autonomous driving road has a function to perform specification examination for the corresponding vehicle through the wireless communication with an entry vehicle and make only a vehicle having the required specification enter the autonomous driving road.

On the other hand, a rotary radius when the vehicle is driven on a curve depends on a weight, an axial center (the center of gravity), a whole length, a full width, a vehicle speed, and the like of the vehicle. This means that the rotary radii of all kinds of vehicles are not the same as each other. Therefore, when the same driving path information is provided to all vehicles without considering a vehicle type in a curve section (curve road), there is a problem that some vehicle types deviate from the road or a traffic line may occur. In order to address the problem, the router that is positioned in the curve section to provide the driving path of the curve has a function to identify the vehicle type of the vehicle, a vehicle kinetic modeling coefficient (e.g., the weight, the axial center, the full length, the full width, the vehicle speed, and the like) for each vehicle type is stored, vehicle kinetic interpretation is performed by using the modeling coefficient, and the progress direction and a steering angle of the vehicle for each time are provided to the vehicle. Accordingly, an autonomous driving speed can be stably increased by the vehicle kinetic interpretation, thereby an autonomous driving service can be more efficiently provided.

In addition, like the corresponding router, the pre-router has a function to identify the vehicle type and determine the progress direction and the steering angle of the vehicle through the vehicle kinetic interpretation using the vehicle kinetic modeling coefficient for each vehicle type against the case where the router installed in the curve section is abnormal.

The autonomous driving assistance apparatus 200 is associated with the cruise control apparatus, the MDPS, and the AEB system mounted on the vehicle, and performs the wireless communication with the router 100 within the communication range to provide vehicle identification information, and progress direction information, and steering angle information of the vehicle to the router and receive the driving path information, and the like from the router 100. In addition, the autonomous driving assistance apparatus 200 makes the vehicle be driven by controlling the speed, the progress direction, and the steering angle of the vehicle according to the driving path information received from the router 100.

Meanwhile, the autonomous driving system may further include a control server 300. In this case, the control server 300 performs a function as a monitoring system that receives and determines various information on the autonomous driving through the wireless communication with the autonomous driving assistance apparatus 200 and may be, for example, a server of a telematics management system (TMS) center. The information provided by the autonomous driving assistance apparatus 200 includes state information (including identification information on the abnormal router when the router is abnormal) of each router and driving history information in the autonomous driving road of the corresponding vehicle.

In the wireless communication between the vehicle and the control server 300, the autonomous driving assistance apparatus 200 may be used, but a mobile device (smart phone) of a driver may be used. In this case, the autonomous driving assistance apparatus 200 performs the wireless communication with the mobile device and transmits various information to the control server 300 through the mobile device.

Figure 2:
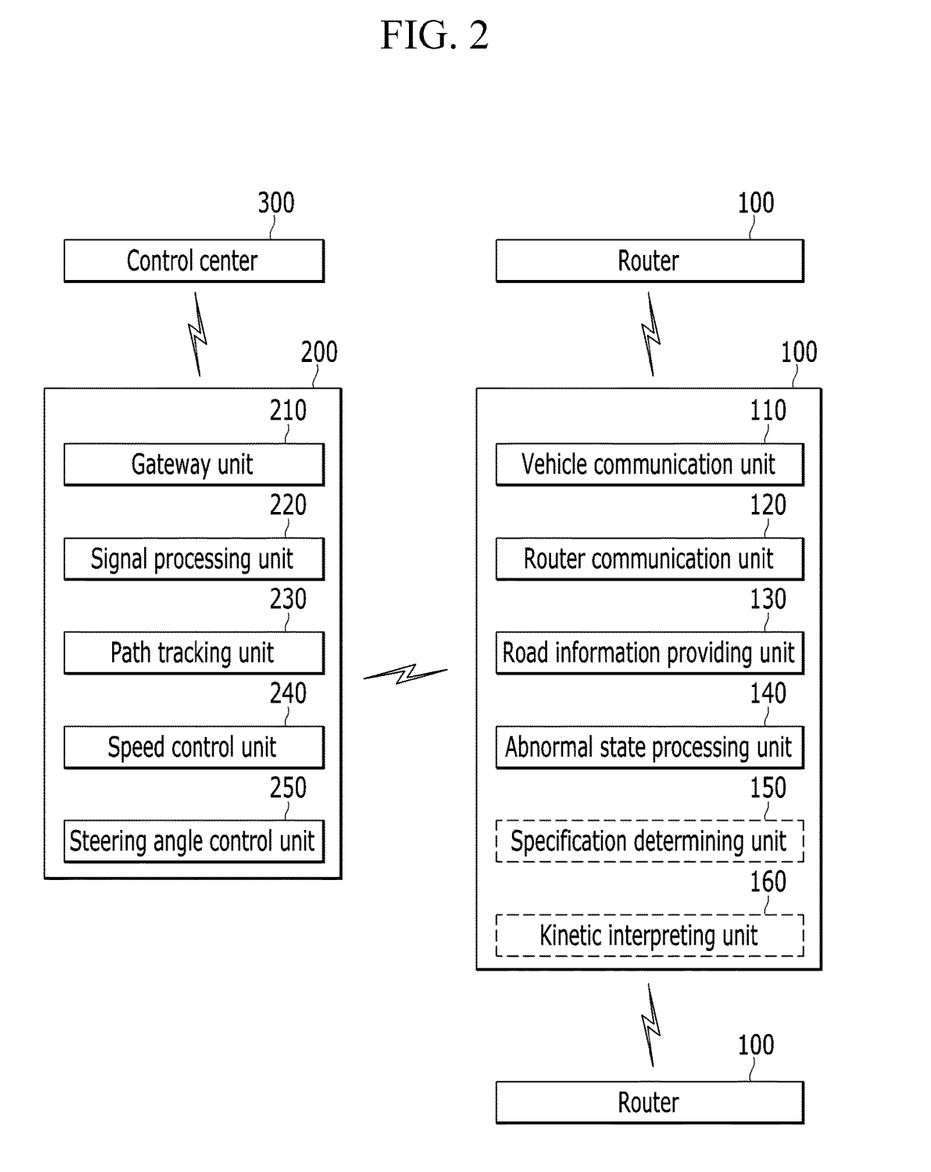
FIG. 2 is a block diagram of a router and an autonomous driving assistance apparatus.

Hereinafter, the router 100 and the autonomous driving assistance apparatus 200 will be described in more detail with reference to FIG. 2. FIG. 2 is a block diagram of a router and an autonomous driving assistance apparatus in an exemplary form of the present disclosure.

Referring to FIG. 2, the router 100 includes a vehicle communication unit 110, a router communication unit 120, a road information providing unit 130, and an abnormal state processing unit 140, and may further include a specification determining unit 150 or a kinetic interpreting unit 160.

The vehicle communication unit 110 identifies the vehicle within a short-range wireless communication range and performs the wireless communication with the identified vehicle. The router communication unit 120 identifies the router within the short-range wireless communication range and performs the wireless communication with the identified router.

The road information providing unit 130 provides the driving path information in the setting section of which the corresponding router takes charge to the autonomous driving assistance apparatus 200 of the vehicle. In this case, the provided driving path information is prestored or determined by the kinetic interpreting unit 160. In addition, the road information providing unit 130 determines information on the vehicle, which is received from the pre-router and the post router to determine a distance between a current vehicle and a precedent vehicle and a distance between the current vehicle and a following vehicle and provide the determined distances to the current vehicle.

The abnormal state processing unit 140 compares the driving path information (the vehicle speed, the progress direction, the steering angle information, and the like) of the vehicle received from the vehicle communication unit 110 with the driving path information provided to the corresponding vehicle to determine whether the corresponding vehicle is different from the driving path information and determines that the vehicle is abnormal when the corresponding vehicle is different from the driving path information. Further, the abnormal state processing unit 140 determines the corresponding router as the abnormal router when there is no response from the neighboring router through the router communication unit 120 (i.e., the neighboring router is malfunctioning). In the case where the vehicle is abnormal, the abnormal state processing unit 140 announces the case to the pre-router and the post router and further, announces the case to the other vehicle and in the case where the router is abnormal, the abnormal state processing unit 140 announces the case to the vehicle.

The specification determining unit 150 may be mounted on the router installed in the entrance router, and determines the specification of the vehicle which enters the communication range, determines whether the vehicle enters the autonomous driving road according to the determined specification, and announces the determination result to the vehicle.

The kinetic interpreting unit 160 determines the vehicle type of the vehicle which enters the communication range, determines the prestored modeling coefficient corresponding to the vehicle type, and determines the progress direction and the steering angle of the vehicle through the kinetic interpretation using the determined modeling coefficient and announces the determined progress direction and steering angle to the vehicle. In this case, the kinetic interpreting unit 160 further includes information on the speed of the vehicle to provide the information to the vehicle.

Figure 5:
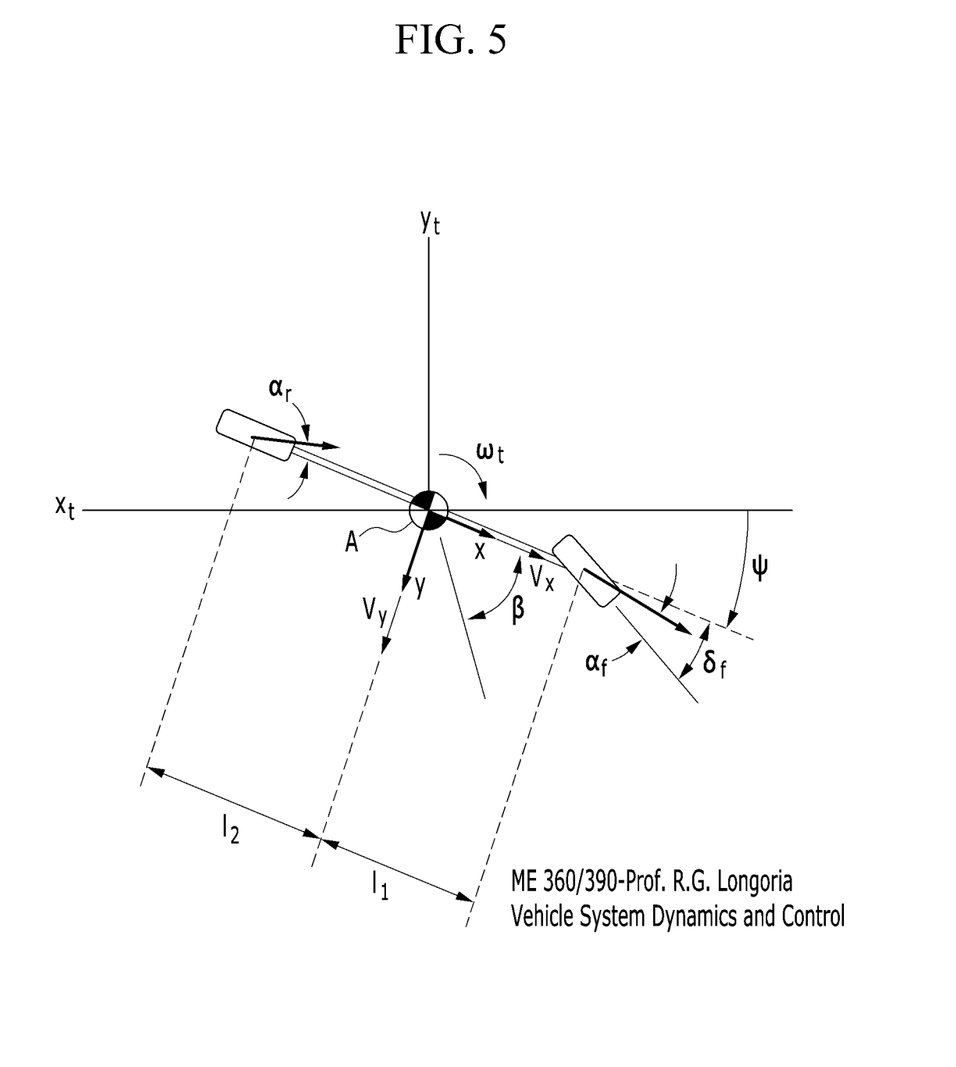
FIG. 5 is a diagram for describing vehicle kinetic modeling.

One example for an operation of the kinetic interpreting unit 160 will be described with reference to FIG. 5. FIG. 5 is a diagram for describing vehicle kinetic modeling in form of the present disclosure.

Referring to FIG. 5, the modeling coefficient to be considered when kinetics of the vehicle is interpreted includes the center of gravity A of the vehicle, the progress direction x of the vehicle, a horizontal direction (left-right direction) y, a vertical direction (up-down direction) z, a whole length (l=l1+l2) which is a distance between the center of a front wheel and the center of a rear wheel, a progress angle ψ, a slip angle ß, a mass m, an angular speed O, a steering angle d, a sliding angle a, and the like and the kinetic interpreting unit 160 acquires Equations 1 to 3 given below by using the modeling coefficient corresponding to the vehicle type of the corresponding vehicle and calculates the progress direction x'(t) of the vehicle, which is a primary differential value and d(t) which is the steering angle of the vehicle through Equations 1 to 3 to provide x'(t) and d(t) to the vehicle.

$$m(\dot{v}_x - V_y\Omega_z) = F_{xf}\cos(\delta_f) + F_{xr} - F_{yf}\sin(\delta_f) \quad \text{(Equation 1)}$$

$$m(\dot{v}_y - V_x\Omega_z) = F_{yf}\cos(\delta_f) + F_{yr} - F_{xf}\sin(\delta_f) \quad \text{(Equation 2)}$$

$$I_z\dot{\Omega}_z = l_1 F_{yf}\cos(\delta_f) - l_2 F_{yr} + l_1 F_{xf}\sin(\delta_f) \quad \text{(Equation 3)}$$

Next, the vehicle driving assistance apparatus 100 includes a gateway unit 210, a signal processing unit 220, a path tracking unit 230, a speed control unit 250, and a steering angle control unit 250.

The gateway unit 210 performs the wireless communication with the router 100 within the communication range and performs the wireless communication with the control server 300 or the mobile device of the driver.

The signal processing unit 220 identifies the type of a signal received through the gateway unit 210 and processes the signal so as to perform the operation corresponding to the received signal. For example, the signal processing unit 220 provides the identification information of the vehicle or the specification information of the vehicle at the time of setting a wireless communication link with the router 100, provides the driving path information (the speed, the direction, the steering angle, and the like) of the vehicle to the router 100 or the control server 300 every set cycle, provides the driving path information to the path tracking unit 230 when receiving the driving path information from the router 100, and provides information on abnormality of the other vehicle or router to the control center 300 through the gateway unit 210 at the time of receiving the abnormality information.

The path tracking unit 230 determines the speed, the progress direction, the steering angle information, and the like included in the driving path information so that the vehicle is driven according to the driving path information received from the router 100. The speed control unit 250 controls the speed of the vehicle in link with the cruise control apparatus and the AEB system according to the speed information received from the path tracking unit 230 and the steering angle control unit 250 controls the steering angle, that is, the progress direction of the vehicle in link with the MDPS according to the information on the progress direction and the steering angle received from the path tracking unit 230.

Figure 3:
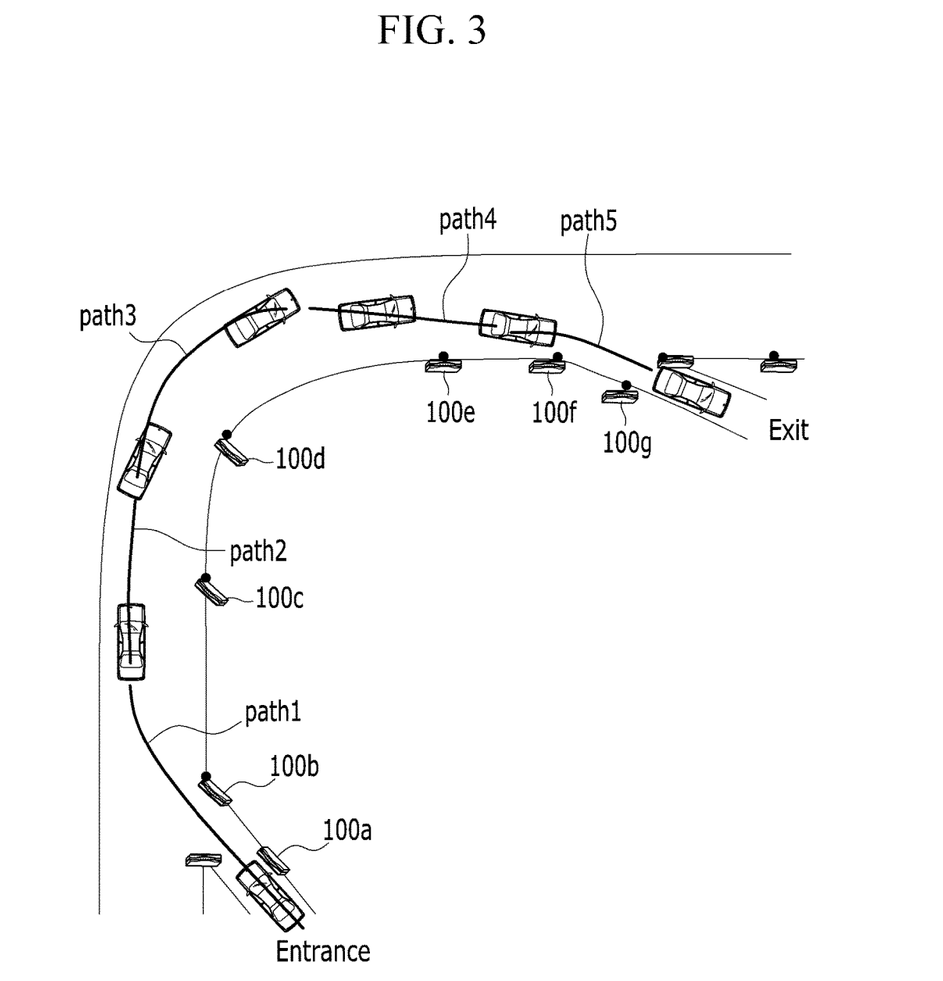
FIG. 3 is an exemplary diagram illustrating an autonomous driving environment.

Hereinafter, the operation of each router in an autonomous driving environment in an exemplary form of the present disclosure will be described with reference to FIG. 3. FIG. 3 is an exemplary diagram illustrating an autonomous driving environment.

When the vehicle enters the autonomous driving road, an entrance router 100a of the access road determines whether the vehicle may perform the wireless communication and the specification of the vehicle, interrupts entrance of the vehicle in which the wireless communication may not be performed and the vehicle when the specification of the vehicle does not satisfy a set condition (the cruise control apparatus, the MDPS, and the AEB system are mounted), and allows only a vehicle which may perform the wireless communication and has the specification of the set condition to enter the access road.

The vehicle which enters the access road receives driving path information path1 from a first router 100b which is the neighboring router of the entrance router 100a to be driven according to the driving path information path1. Herein, the entrance router 100a may provide the driving path information path1 and since the first router 100b is positioned in the curve section, the driving path information path1 may be the driving path information determined by the vehicle kinetic interpretation. However, since the vehicle which enters the access road starts from the stop state, the speed is not high, even though the first router 100b is positioned in the curve section, the first router 100b may not perform the vehicle kinetic interpretation.

When the vehicle driven according to the driving path information path1 enters the communication range of a second router 100c, the vehicle performs the wireless communication with the second router 100c to receive driving path information path2 and be driven according to the driving path information path2.

Then, when the vehicle enters the communication range of a third router 100d, the vehicle performs the wireless communication with the third router 100d to receive path information path3 and be driven according to the path information path3 and when the vehicle sequentially enters the communication ranges of fourth and fifth routers 100e and 100f, the vehicle receives each driving path information path4 or path5 and is driven according to the driving path information path4 or path5. In this case, since the third to fifth routers 100d, 100e, and 100f are positioned in the curve section, the driving path information path3, path4, or path5 is driving path information determined by the vehicle kinetic interpretation.

Meanwhile, the signal processing unit 220 of the autonomous driving assistance apparatus 200 of the vehicle announces the progress direction (a change in progress direction such as left turn or right turn) at a road branch point or an outgoing intention to the corresponding outgoing point to the current router 100 when a distance between a current location and the road branch point or the outgoing point is within a predetermined distance in the case where a front road is the road branch point such as an intersection, or the like or the outgoing point of the autonomous driving road exists and the vehicle turns at the road branch point or goes out to the outgoing point.

Then, the router 100 that receives the progress direction or the outgoing intention announces the fact to post routers to provide the driving path information which matches the vehicle progress direction or outgoing of the vehicle to the vehicle, that is, the autonomous driving assistance apparatus 200.

For example, when the vehicle announces outgoing to the autonomous driving road to the third router 100d, the third router 100d announces outgoing of the corresponding vehicle to the fourth router 100e, the fourth router 100e announces outgoing of the corresponding vehicle to the fifth router 100f, and the fifth router 100f announces outgoing of the vehicle to an outgoing router 100g.

Figure 4:
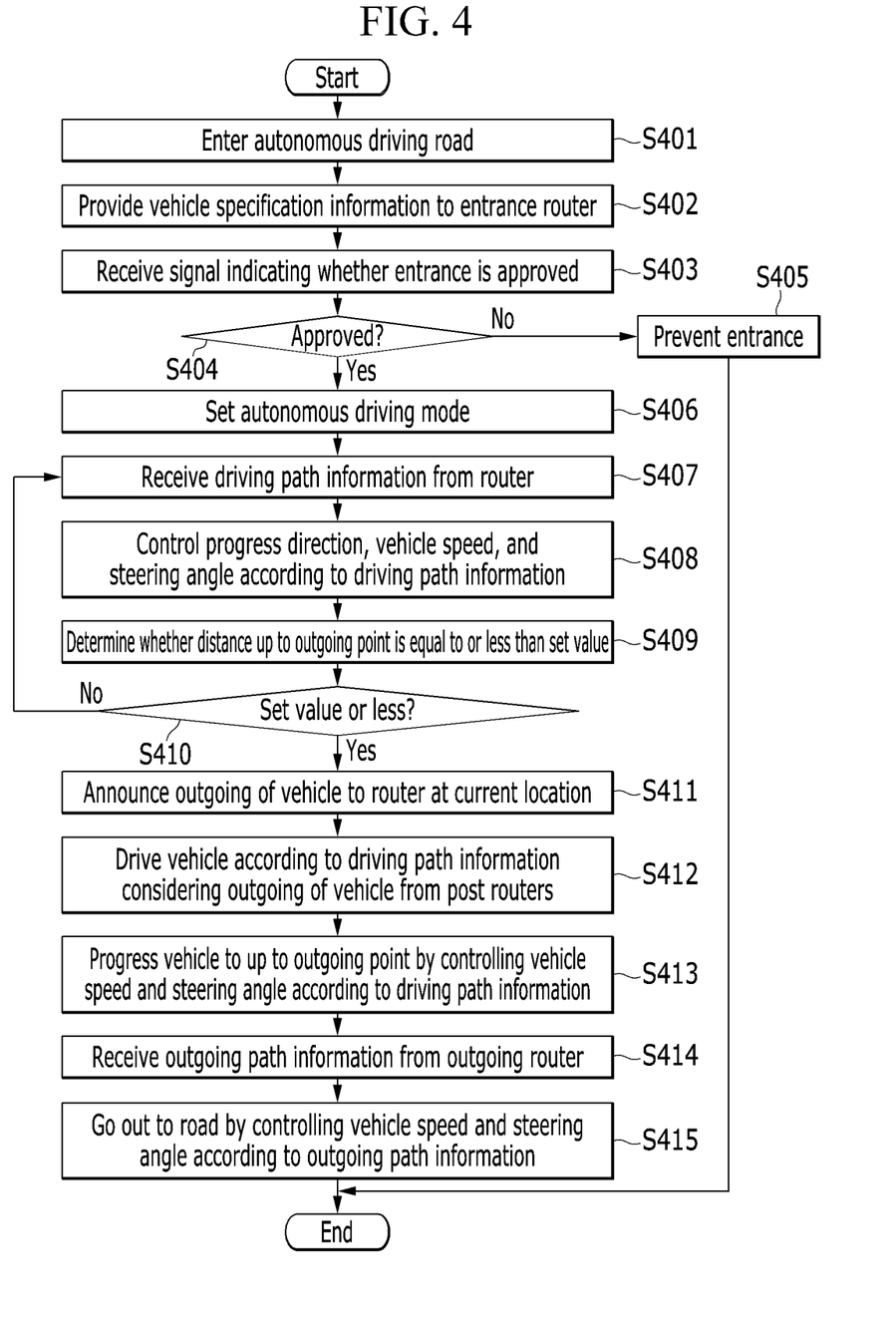
FIG. 4 is an operation flowchart of an autonomous driving system.

Hereinafter, an autonomous driving method in the autonomous driving environment illustrated in FIG. 3 will be described with reference to FIG. 4. FIG. 4 is an operation flowchart of an autonomous driving system in an exemplary form of the present disclosure.

The vehicle enters the entrance of the access road of the autonomous driving road in the general road (S401). Then, the autonomous driving assistance apparatus 200 of the vehicle receives a request for providing use information from the entrance router 100a installed on the access road and provides the vehicle specification information to the entrance router 100a in response to the request (S402).

The autonomous driving assistance apparatus 200 receives a signal indicating whether entrance is approved from the entrance router 100a (S403), when an entrance prevention signal is received (S404), the autonomous driving assistance apparatus 200 performs an operation corresponding to entrance prevention (S405) and when an entrance approval signal is received (S404), the driver switches and sets a manual driving mode to the autonomous driving mode (S406). In the case of the autonomous driving vehicle, process S406 may be omitted.

The autonomous driving assistance apparatus 200 of the vehicle which enters the autonomous driving road receives the driving path information through the wireless communication with the router 100 within the communication range (S407) and is driven along a path announced by the router 100 by controlling the progress direction, the speed, and the steering angle according to information included in the driving path information (S408).

The autonomous driving assistance apparatus 200 determines the path to the current location and a set target point while being driven on the autonomous driving road according to an instruction of the router 100 to determine a remaining distance from the outgoing point of the autonomous driving road up to the current location (S409) and determines whether the remaining distance is equal to or less than a set value (S410). Herein, processes S409 and S410 are applied even in the case where the vehicle changes the progress direction to a left side or a right side at a road branch point (intersection point).

The autonomous diving assistance apparatus 200 is continuously driven according to the driving path information received from the router 100 when the remaining distance is equal to or more than a predetermined value and announces the outgoing of the vehicle, which includes the vehicle outgoing location to the corresponding router 100, for example, the third router 100d when the remaining distance is equal to or less than the predetermined value (S411).

Then, the third router 100d announces the outgoing of the vehicle including the outgoing location of the corresponding vehicle to the fourth router 100e, the fourth router 100e announces the outgoing of the vehicle to the fifth router 100f, and the outgoing router 100g that is positioned at the outgoing location of the vehicle and on the vicinity thereof is allowed to finally know the outgoing of the vehicle.

In this case, the post routers 100d to 100f provides the driving path information considering the outgoing of the vehicle to the autonomous driving assistance apparatus 200 after receiving the vehicle outgoing intention. The vehicle is driven according to the driving path information provided by the post routers 100d to 100f until reaching the outgoing router 100g (S413).

When the vehicle reaches the outgoing router 100g, the autonomous driving assistance apparatus 200 receives the outgoing path information from the outgoing router 100g (S414) and is driven according to the received outgoing path information to deviate from the autonomous driving road (S415).

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

<Description of symbols>

| | |
|---|---|
| 100, 100a, 100b, 100c, 100d, 100e, 100f, 100g: Router | |
| 100a: Entrance router | 100g: Outgoing router |
| 200: Autonomous driving assistance apparatus | |
| 300: Control center | |
| 110: Vehicle communication unit | 120: Router |
| 130: Road information providing unit | |
| 140: Abnormal state processing unit | |
| 150: Specification determining unit | |
| 160: Kinetic interpreting unit | |
| 210: Gateway unit | 220: Signal processing unit |
| 230: Path tracking unit | 240: Speed control unit |
| 250: Steering angle control unit | |

What is claimed is:

1. An autonomous driving system including an autonomous driving assistance apparatus, the autonomous driving system comprising one or more processors configured to:
   perform wireless communication with a router within a communication range among a plurality of routers installed in an autonomous driving road;
   provide identification information of a vehicle at a time of setting a wireless communication link with each router of the plurality of routers;
   provide driving path information of the vehicle to the router every set cycle;
   determine a speed, a progress direction, and a steering angle of the vehicle included in the driving path information so that the vehicle is driven based on the driving path information received from the router;
control a speed of the vehicle based on the determined speed; and
control a steering angle of the vehicle based on the determined progress direction and steering angle.

2. The autonomous driving system of claim 1, wherein:
the one or more processors are configured to:
provide specification information of the vehicle to an entrance router when receiving a request for the specification information of the vehicle from the entrance router installed on an access road of an autonomous driving road,
receive the driving path information from the entrance router when the specification information of the vehicle satisfies a set specification, and
receive a driving prevention announcement in the autonomous driving road from the entrance router when the specification information does not satisfy the set specification.

3. The autonomous driving system of claim 1, wherein:
The one or more processors are configured to announce the progress direction at a road branch point or an outgoing intention to an outgoing point to a router which is under communication at present when a distance between a current location and the road branch point or the outgoing point is within a predetermined distance when a front road is the road branch point or the outgoing point of the autonomous driving road exists and the vehicle turns at the road branch point or goes out to the outgoing point.

4. The autonomous driving system of claim 3, wherein the road branch is an intersection.

5. The autonomous driving system of claim 3, wherein:
a current router and routers positioned after the current router are configured to provide the driving path information corresponding to a direction turn and an outgoing to the autonomous driving assistance apparatus through the wireless communication among neighboring routers based on the progress direction of the vehicle to allow a corresponding vehicle to change a direction to a target direction or induce the corresponding vehicle to a corresponding outgoing point at the road branch point, and the autonomous driving assistance apparatus is configured to provide the outgoing intention in the progress direction or to the outgoing point at the road branch point.

6. The autonomous driving system of claim 1, wherein:
the one or more processors are configured to receive the driving path information received from each router of the plurality of routers and the driving path information is driving path information for driving the vehicle in a set section.

7. The autonomous driving system of claim 6, wherein:
the set section is a maximum distance section where one router of the plurality of routers is configured to perform the wireless communication with the vehicle on the autonomous driving road.

8. The autonomous driving system of claim 6, wherein:
the one or more processors are configured to receive the driving path information provided by an abnormal router from a pre-router of the abnormal router and the driving path information is provided when the abnormal router exists.

9. The autonomous driving system of claim 1, wherein:
when information of abnormality of another vehicle or an abnormality of at least one router of the plurality of routers is received, the one or more processors are configured to provide the received information to a control center.

10. The autonomous driving system of claim 9, wherein:
each entrance router, each outgoing router, and each router of the plurality of routers is configured to
perform the wireless communication with a neighboring router to determine whether the neighboring router is malfunctioning.

11. The autonomous driving system of claim 10, wherein:
each entrance router, each outgoing router, and a router positioned in a curve section among the plurality of routers is configured to determine a vehicle kinetic modeling coefficient corresponding to a vehicle type and perform vehicle kinetic interpretation based on the determined vehicle kinetic modeling coefficient to determine the driving path information and provide the determined driving path information to the vehicle.

12. The autonomous driving system of claim 1, further comprising:
an entrance router installed in each access road of the autonomous driving road;
an outgoing router installed in each outgoing road of the autonomous driving road; and
a plurality of routers installed on a road between each entrance router and each outgoing router,
wherein each entrance router, each outgoing router, and each router of the plurality of routers have unique identification information, and each router is configured to perform the wireless communication with the vehicle within the communication range, and to provide the driving path information for a set section to the vehicle to allow the vehicle to be driven to a set movement path within the set section based on the driving path information.

13. The autonomous driving system of claim 12, wherein:
a current router and routers positioned after the current router are configured to provide the driving path information corresponding to a direction turn and an outgoing to the autonomous driving assistance apparatus through the wireless communication among neighboring routers based on the progress direction of the vehicle to allow a corresponding vehicle to change a direction to a target direction or induce the corresponding vehicle to a corresponding outgoing point at a road branch point, and the autonomous driving assistance apparatus is configured to provide an outgoing intention in the progress direction or to the outgoing point at the road branch point.

14. The autonomous driving system of claim 1, wherein:
each entrance router, each outgoing router, and each of the plurality of routers is configured to compare the vehicle speed and steering angle received from the vehicle with the vehicle speed and steering angle included in the driving path information provided to a corresponding vehicle to determine whether the corresponding vehicle is abnormal.

* * * * *